Jan. 18, 1955

M. WALLACE 2,700,101

PANORAMIC DEVICE

Filed April 19, 1946

4 Sheets-Sheet 1

Inventor
MARCEL WALLACE

By Hyman Hurvitz

Attorney

Jan. 18, 1955 M. WALLACE 2,700,101

PANORAMIC DEVICE

Filed April 19, 1946 4 Sheets-Sheet 2

Inventor
MARCEL WALLACE

By Hyman Hurvitz

Attorney

Jan. 18, 1955 M. WALLACE 2,700,101

PANORAMIC DEVICE

Filed April 19, 1946 4 Sheets-Sheet 3

Inventor
MARCEL WALLACE

By Hyman Hurvitz

Attorney

Inventor
MARCEL WALLACE

By Hyman Hurvitz

Attorney 2,700,101

PANORAMIC DEVICE

Marcel Wallace, Fairfield County, Conn., assignor, by mesne assignments, of one-half to said Wallace, doing business as Panoramic Laboratories, East Port Chester, Conn.

Application April 19, 1946, Serial No. 663,312

12 Claims. (Cl. 250—20)

My invention relates broadly to radio receiving systems and more particularly to improvements in panoramic systems of radio reception.

Panoramic systems of radio reception, as is now well known, provide means for sweeping a predetermined band of frequencies, the center frequency of the said predetermined band as well as the width of the said band being usually adjustable, and subject to selection at will. The characteristics of signals existing within the predetermined band may be displayed on a suitable viewing device, which may be a cathode ray oscilloscope, each signal producing a deflection, the amplitude of which is indicative of its intensity or strength, and the position of which along a base line is indicative of its relative frequency.

My application Serial No. 420,014 filed November 21, 1941, and now Patent 2,367,907, issued January 23, 1945, discloses several receiving systems of the above character. U. S. Patent #2,381,940, issued to the present inventor and to H. Miller jointly, discloses further such systems.

More in detail, in order to provide a suitable background for the consideration of the present invention, a panoramic receiver may involve a frequency scanning and tunable local oscillator which serves to convert all signals within a predetermined band of frequencies to a suitable frequency for intermediate frequency amplification, the output of the I. F. amplifier being applied to a suitable oscilloscope for visual presentation simultaneously of all signals which may be present in the swept band. Aural output may be derived from the I. F. amplifier, if desired.

On the other hand, a panoramic adaptor is, by definition, a panoramic device which operates in conjunction with a companion receiver, which may or may not be of the superheterodyne type. Several distinct modes of combination of the panoramic adaptor with the companion receiver may be envisaged. In one mode the companion receiver may operate in its conventional manner to receive and detect signals within the scope of its tuning capabilities. The panoramic adaptor utilizes an input circuit in common with the companion receiver. Both the panoramic adaptor and the companion receiver receive signals from the said input circuit, being connected, usually, in parallel, and both may be provided with further ganged tunable input circuits, to the end that a signal being aurally received will also be indicated on the screen of the panoramic adaptor, the latter of course displaying not only the aurally received signal but also a spectrum of frequencies extending about the aurally received signals.

Still a further mode of operation of a panoramic adaptor involves the combination with a companion receiver which utilizes the well known superheterodyne circuit. The panoramic adaptor input may be connected to the output of the converter tube of the superheterodyne receiver, for analysis and panoramic indication of a band of frequencies centered on the I. F. frequency of the companion receiver.

The above examples of panoramic devices are not to be taken as limiting the application of the invention described and claimed in the present application, since many further modes of application of the panoramic technique are known to those skilled in the art, to which the application of compensating means of the same general character may be applied. Reference is here made to the patents above referred to for at least some examples of possible modes of application of the panoramic technique to which the dynamic compensation method hereinafter described, and illustrated in the accompanying drawings, may be applied by those skilled in the pertinent art.

Patent 2,381,940, which was referred to above, discloses a panoramic device having an input circuit the band pass characteristic of which is such as to provide compensation for the selectivity characteristic of the input stage of its companion receiver, substantially complete compensation being attained when signals of the same intensity produce the same response, in respect to amplitude, at any point in the spectrum which may be subject to analysis at a given time by the panoramic device.

The method of compensation disclosed in Patent 2,381,940 may be described as a "static" method of compensation, in that the method involves adjustment or selection of circuit elements. This system is inherently to some degree inflexible, and does not readily lend itself to rapid modification of the comparative amplification of the panoramic device and of the associated input circuit to compensate for modifications of the selectivity characteristic of the input circuit, which may take place as the frequency range within which operation is taking place is changed, or to changes in the amplification characteristics of the panoramic device as the sweep width or scanning range thereof is varied, or which may occur due to tracking failures or to asymmetrical tuning, or to still further causes.

It is an object of the present invention to provide means for "dynamic" compensation in panoramic adaptors and panoramic devices generally. The term "dynamic" is to be understood to convey, in the present contex, the idea that compensation is effected by a continually varying force or voltage.

It is a further object of this invention to provide means for periodically, and in continuing recurrence, varying the sensitivity of a panoramic device in time and phase synchronism with the sweep of the spectrum, and in such manner as to increase the sensitivity where the signal is weakened due to input circuit selectivity, or to decrease the sensitivity where the signal is strong due to input circuit selectivity, and in such manner and degree as to effect substantial compensation over the entire swept spectrum.

Still a further object of the invention is to provide compensation means for panoramic devices which are susceptible to adjustment and variation in accordance with requirements presented by the location in the overall radio spectrum of the various spectrum portions being swept, it being generally understood that different degrees of compensation are normally required for the high and the low tuning ranges.

It is still a further object of the invention to provide compensation means which shall provide a curve of compensation voltage which shall be peaked, and which shall be so constructed and arranged that the compensation peak may be readily shifted with respect to the center frequency of the range of frequencies swept by the panoramic device.

Another object of the invention is to provide means for providing compensation which may be rendered asymmetrical with respect to the center frequency of the panoramic receiver or the panoramic adaptor undergoing compensation.

Further among the objects of the invention, is the provision of readily controllable means for varying the extent or amount of compensation introduced into a panoramic device, as the sweepwidth of the panoramic device is varied, the quantities sweepwidth and extent of compensation or magnitude of the compensating effect being simultaneously varied by means of controlling mechanisms which are suitably ganged for automatic simultaneous variation and adjustment.

Another object of the invention, is the provision of means for automatically controlling the degree of compensation introduced into the panoramic device, as the sweepwidth of the panoramic device is varied.

It is still another object of the invention to provide panoramic devices generally, and panoramic devices provided with dynamic compensation in particular, with means for presenting a visual indication of the degree to which compensation is actually attained over the entire receiver acceptance band, and at any region within the tuning range of the receiver.

Another object of the invention resides in the provision of dynamic compensation for panoramic devices which shall automatically provide substantially complete compensation under all conditions of operation of the device, eliminating the need for any adjustments whatsoever.

The manner of attaining the above objects of the invention, as well as still further objects, and the various advantages of the invention, above described, as well as still further advantages, will be made obvious upon study of the following detailed description, when considered in conjunction with the accompanying drawings, wherein:

Figures 1*a*–1*d*, inclusive, illustrate various curves having importance in the analysis of the present invention;

Figure 2:
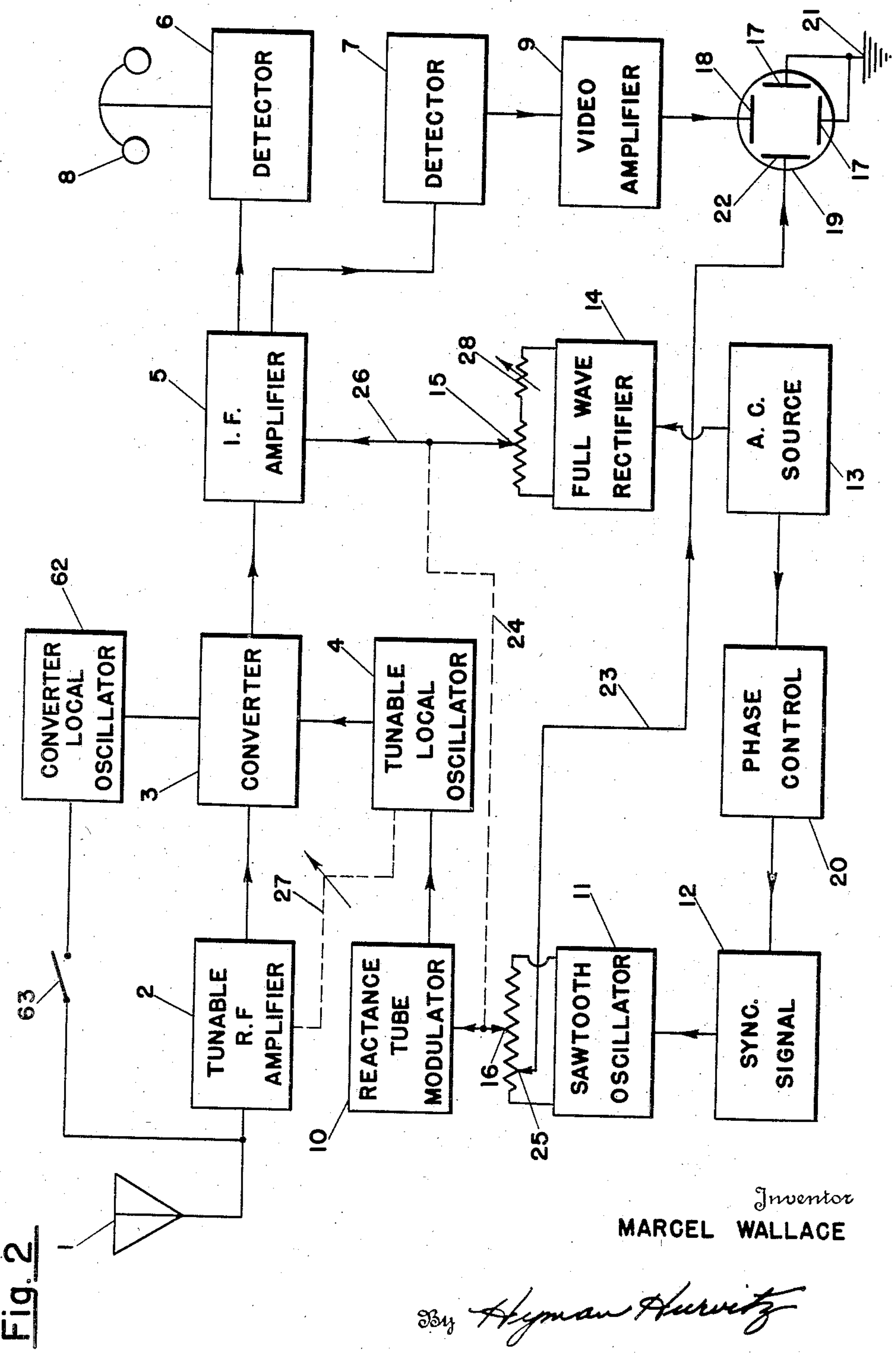
Figure 2 is a block circuit diagram of one embodiment of the invention, illustrating a manual ganged method of control of dynamic compensation of a panoramic receiver.

Referring now specifically to Figure 2 of the drawings, there is illustrated an antenna 1, which may be, in fact, of any character known to the art, that is, directional or non-directional, narrow band or wide band, and of any desired type of construction, since the antenna in its broadest significance is merely a source of signals. For some purposes it may be desirable to substitute for the antenna 1 some other source of signals, such as a transmission line or wire communication system or signals emanating from various testing, signaling or measuring panels.

The signals supplied by the source 1 may be selected and amplified by the manually or mechanically tunable R. F. amplifier 2, which supplies a converter or mixer 3, having the function of combining the signal supplied by the R. F. amplifier 2 with further signals supplied by a manually or mechanically tunable local oscillator 4, the output of the mixer being applied to the I. F. amplifier 5, tuned to a fixed frequency, and supplying at its output an audio detector 6 as well as a video detector 7. The output signal of the audio detector 6 may be supplied to aural reproduction means 8, such as a speaker or telephones and/or to any type of output indicator such as a recorder and may, if desired, be amplified prior to such reproduction.

The circuits above described will be recognized as corresponding, in general, to the conventional superheterodyne circuit, which is now in common use and well understood by those skilled in the electronics art.

In order to provide a panoramic receiver it is necessary to cause the local oscillator 4 periodically to sweep a portion of the radio spectrum, thereby in effect cause the local oscillator to probe for signals within the swept range; and since any signals which may be discovered are to be displayed on the screen of a cathode ray oscilloscope, the periodic sweep is required to take place at a rate above that of the persistence of vision. For this purpose there is provided a reactance tube modulator 10 which, as is well known, when properly interconnected with an oscillator such as the tunable local oscillator 4, has the effect of introducing reactance into the circuit associated with said oscillator, whereby to vary the frequency of the signal produced by the oscillator. Since the magnitude of the reactance introduced by the reactance tube modulator circuit is dependent on the amplitude of a control signal supplied to the said modulator, it becomes a relatively simple matter to cause the frequency of the local oscillator 4 to vary linearly between determinable limits, and to provide for indefinite recurrence of the variations, by supplying to the reactance tube modulator a saw-tooth voltage from a source of such voltage, designated by the numeral 11, the output of which may be fed to the reactance tube modulator via a suitable potentiometer device 16 for controlling the amplitude of the saw-tooth signal supplied to the modulator and thereby the magnitude of the swept band of frequencies. For the device 16 may be substituted, as circumstances dictate, an amplifier comprising means for controlling amplification, or an attenuator pad or a more complex form of voltage divider or potentiometer.

The A. C. source 13 provides voltage to the compensation means, comprising full-wave rectifier 14 and an amplitude control device 15, in the form of a potentiometer, for the signal derived from the rectifier, the voltage derived from the amplitude control device 15 being applied to the I. F. amplifier 5 dynamically to vary the amplification thereof.

The A. C. source 13 may be the 60 cycle line current, normally used for supplying power to the various components of the embodiment of my invention presently being described; alternatively, the A. C. source may be an oscillator having a fundamental output frequency differing from 60 cycles. It will be obvious, nevertheless, regardless of the character of the source of alternating current denoted by 13, that rectifier 14 will provide a series of half sine waves of current at its output at a rate of recurrence determined by the frequency of the source 13.

The specific manner in which the amplification of the I. F. amplifier may be controlled by the voltage derived from the rectifier 14 does not form part of the present invention and any means known in the pertinent art may be utilized. It is, however, essential that the control voltage be applied in proper sense and in proper phase to the I. F. amplifier 5. For the purpose of the present invention, it is sometimes desirable that the amplification of the amplifier 5 be at its minimum at the center of the sweep and at its maximum at each edge of the swept spectrum. It is, accordingly, essential to provide means for controlling the phase of the saw-tooth voltage produced by the source of saw-tooth voltage 11 with respect to the phase of the amplification control voltage derivable from the rectifier 14. For this purpose, a synchronizing signal for the saw-tooth oscillator is derived from the alternating current output of the A. C. source 13 by means of a suitable circuit means 12.

By virtue of the interlocking of phase of the reactance provided by the modulator 10, the voltage provided by the saw-tooth oscillator 11 and the A. C. source 13, there is provided synchronous variation of the sweeping frequency of the oscillator 4, of the sweep voltage applied from the saw-tooth source 11, via the amplitude controlling potentiometer contact 25 to the horizontal plates 22 of the cathode ray oscillograph 19, and the dynamic compensation voltage available at the output of the device 14 and applied to the I. F. amplifier 5 via the amplitude controlling potentiometer 15, and the line 26.

Figures 1A, 1B, 1C, 1D:
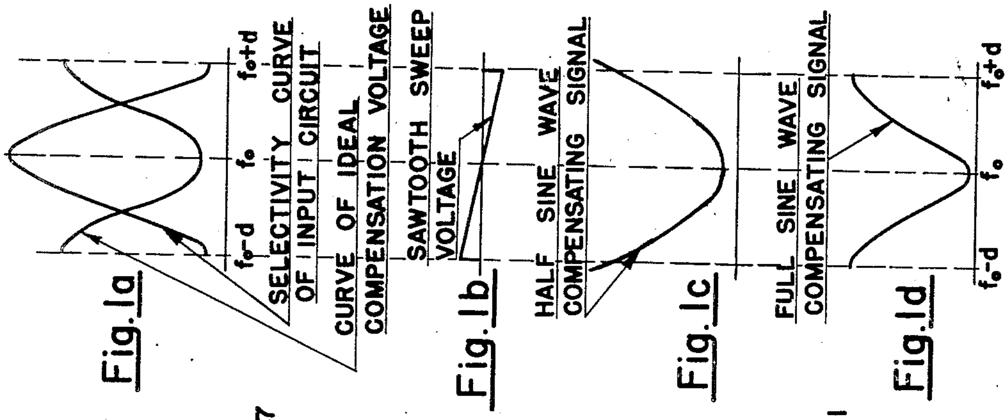

The normal selectivity curve of the antenna 1 and the R. F. amplifier 2, as illustrated in Figure 1*a* of the drawings, provides a curve approximating closely, although not eaxctly in shape, the outline of the type of curve which may be compensated for by the half sine waves produced in the rectifier 14, and illustrated at Figure 1*c* of the drawings. Because of this characteristic of half sine wave signals as well as because of the simplicity with which such signals may be produced, they provide extremely desirable wave forms of dynamic compensation voltage.

It has been explained that the amplitude control device 16 provides means for varying the sweep width of the local oscillator 4 by varying the control voltage applied to the reactance tube 10. Since less compensation is required when a narrower frequency spectrum is being swept than is required when a wider spectrum is being swept, it is desirable to vary the amplitude of the dynamic compensation voltage applied to the I. F. amplifier 5 concurrently with reduction of sweep width. For this purpose, the sweep width control device 16 is ganged via a mechanical linkage 24 to the similar control device 15 in the output of the rectifier 14. Adjustment of device 15 serves to adjust the peak value of the dynamic compensation voltage applied to the I. F. amplifier 5.

Since less compensation is required when operating in the higher frequency ranges of the amplifier 2 than is required for the lower ranges of frequency, an additional unganged amplitude control device 28, which may comprise a manually adjustable attenuator pad or rheostat, is applied in the compensation control path. Manual adjustment of the device 28 provides for adjustment of the peak voltage applied to the contact 15, in an obvious manner.

Since it occurs in connection with some receivers that the selectivity characteristic of the input circuit is asymmetrical, it is desirable to provide means for rendering the compensation control signal similarly asymmetrical. This objective may be readily accomplished by the expedient of providing relative phase control between the sweep voltage at control 16 and the compensation signal at control 15, thereby enabling the peak of the compensating voltage to be shifted with respect to the median point of the saw-tooth voltage. Phase control may be accomplished by interposing an adjustable phasing network 20 between the A. C. source 13 and the device 12 for producing synchronizing voltage. Alternatively a phasing network may be interposed between the A. C. source 13 and the input circuit of the rectifier 14.

In the preferred embodiment of the invention the former expedient is resorted to, although no special advantages result thereby. It is, of course, essential in the embodiment of the invention disclosed in Figure 2 that a synchronizing effect be produced for each half cycle of alternating current in the output of A. C. source 13, since full wave rectifier 14 produces two waves of compensation voltage for each cycle of output of the source 13.

Figure 3:
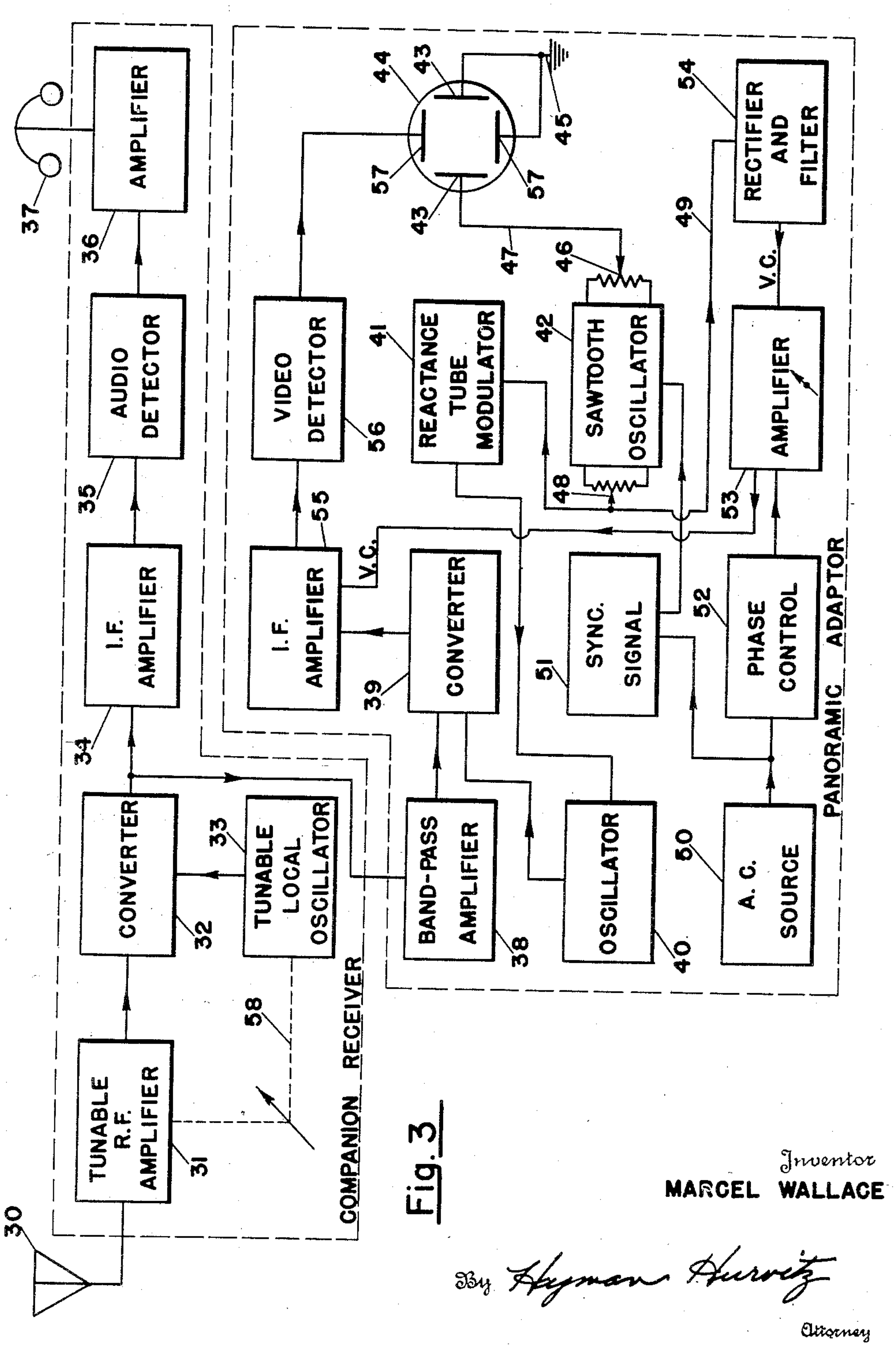
Figure 3 is a block circuit diagram of a further embodiment of the invention, illustrating an automatic method of control of dynamic compensation as applied to a panoramic adaptor.

Referring now specifically to Figure 3 of the drawings, there is illustrated a panoramic adapter associated with a companion receiver the panoramic adaptor comprising circuit means for controlling the amplitude of a dynamic compensating voltage automatically, in accordance with the sweep width adjustment of the panoramic adaptor.

The numeral 30 represents an antenna or other source of signals, for the companion receiver and the panoramic adaptor. Signals made available in the source 30 may be selected in the tunable R. F. amplifier 31, and after amplification therein applied to a converter or mixer circuit 32, to which is also supplied a locally produced signal, generated by the tunable oscillator 33. The local oscillator is normally ganged, as indicated by the broken line 58, with the tunable R. F. amplifier 31, in such fashion that signals selected by the R. F. amplifier 31 may be heterodyned with the output of the local oscillator 33, in the converter 32, to produce a signal of suitable frequency for amplification in the fixed tune I. F. amplifier 34. The output of the I. F. amplifier is applied to a suitable detector 35, and the detected signal amplified, if desired, in the amplifier 36 and applied to a suitable output device 37, such as headphones, speaker, recorder or other indicator.

There is derivable from the output of the converter 32 a band of frequencies centered about the I. F. frequency of the companion receiver but having a far greater range than may be translatable by the I. F. amplifier 34. This band of frequencies is to be indicated panoramically on a suitable cathode ray oscilloscope comprised in a panoramic adaptor, as will be hereinafter explained. Since the antenna 30, the R. F. amplifier 31 and the converter 32 present to an incoming band of signals an effective selectivity which varies from a maximum at or adjacent to the center frequency of the band of frequencies, and falling away from this maximum at frequencies on either side of this maximum, substantially or approximately after the manner of the curve labelled "selectivity curve of input circuit," in Figure 1*a* of the drawings, it is necessary to provide adequate compensation in the panoramic adaptor for the selectivity variations of the input circuit of the so-called companion receiver. Ideal compensation for companion receiver input selectivity is illustrated in Figure 1*a* of the drawings, the appropriate curve being properly labelled. It will be evident upon study of the curves presented in figure 1*a* that an excellent approximation to the curve of ideal compensation may be provided, in the form of a half-sine wave, as illustrated in Figure 1*c* of the drawings, or by a full sine wave, properly phased, as illustrated in Figure 1*d* of the drawings. The manner in which the desired compensation is achieved will become evident as the detailed description proceeds.

The panoramic adaptor proper derives its input from the output of the converter 32, amplifying that input in a wide band amplifier 38, the output of the amplifier 38 being applied to a converter 39, which is supplied further with the output of an oscillator 40 which is associated with a reactance tube modulator 41 for frequency modulating the output of the local oscillator 40.

The reactance tube modulator 41 is controlled by voltages of saw tooth character, such as are illustrated at Figure 1*b*, and which are generated by a saw tooth oscillator 42, which supplies base line or sweep voltage also to one horizontal plate 43, of an oscillograph 44, the other horizontal plate being grounded at 45. Potentiometer control means 46 is provided in the line 47 between the saw tooth oscillator 42 and the plate 43, to enable adjustment of the length of the base line. Further potentiometer control means 48 is provided between the sawtooth generator 42 and the reactance tube modulator 41, to enable adjustment of the amplitude of the control voltage applied to the modulator, whereby the extent of frequency sweep may be adjusted.

Dynamic compensating voltage is derivable from an A. C. source 50, which may be an oscillator, if desired, although any suitable source of alternating current, such as a power line, may also be found suitable. The A. C. voltage from the source 50 is applied to a device 51 for producing synchronizing signals, one for each full cycle of alternating current, which are applied to the sawtooth generator for synchronizing the operation thereof with the production of dynamic compensating voltage.

The signal derivable from the source 50 is applied via a manually adjustable phase variator or control means 52, which provides means for varying the relative phases of the sawtooth voltage produced by the sawtooth oscillator 42 and the dynamic compensating voltage derivable from the amplifier 53.

For receiver inputs having, in a given range of frequencies, a symmetrical selectivity curve, the relative phases of the compensating voltage and the sawtooth voltage may be adjusted to provide minimum amplification at the center of the sweep frequency, and maximum amplification at each end of the sweep, as in Figure 1*d*. It will often occur, however, that the receiver input selectivity is asymmetrical, for various reasons. In such case the compensating voltage may be rendered likewise asymmetrical by suitable adjustment of the phase control means 52, to cause a shift of the peak of the dynamic compensation characteristic illustrated in Figure 1*d*, with respect to the center point of the sweep frequency.

It has been heretofore explained that, as the sweep width of the panoramic adaptor is varied, and this may be accomplished by adjustment of control 48, the required maximum amplitude of compensation decreases. In the embodiment of the invention illustrated in Figure 2 of the drawings, adjustment of compensation with sweep width was accomplished by ganging the sweep width control with a control for adjusting compensation voltage.

In the embodiment of the invention illustrated in Figure 3 of the drawings, an automatic electrical method of adjustment is utilized, which is more accurate than the ganging method, as well as otherwise advantageous. In the automatic method, the voltage derived from the control device 48 is applied not only to the reactance tube modulator 41, but also to a rectifier and filter 54 which rectifies the sawtooth voltage and filters and smooths same sufficiently to produce a relative smooth direct current voltage, the magnitude of which, being dependent on the magnitude of the control voltage applied to the reactance tube modulator 41, is in like manner dependent on the sweep width of the panoramic adaptor.

The direct current output of the rectifier and filter 54 is applied as a volume control voltage to the amplifier 53, and in such sense as to serve to adjust the gain thereof in direct proportion to the sweepwidth of the adaptor.

The output of the amplifier 53 is applied as a dynamic compensation voltage, to the I. F. amplifier 55 of the panoramic adaptor, the output of the I. F. amplifier 55 being detected in the video detector 56 and applied to one vertical plate 57 of the cathode ray oscilloscope 44, the other vertical plate 57 being grounded, at 45.

The amplifier 53 is supplied with manual means for adjusting the gain thereof, in addition to the automatic means above described, in order to provide a convenient mechanism for adjusting the value of the dynamic compensation voltage, to values suitable to the various bands of frequencies receivable by the companion receiver, it being understood that less compensation is generally required in the higher frequency ranges than is required in the lower frequency ranges.

Synchronization of the voltage produced by the sawtooth generator 42 and the compensation voltage present at the output of amplifier 53 may be accomplished by deriving a synchronizing signal from the source 51, controlled by the A. C. source 50, and so operative as to provide one cycle of saw tooth voltage for each complete cycle of voltage output of the A. C. source 50.

Figure 4:
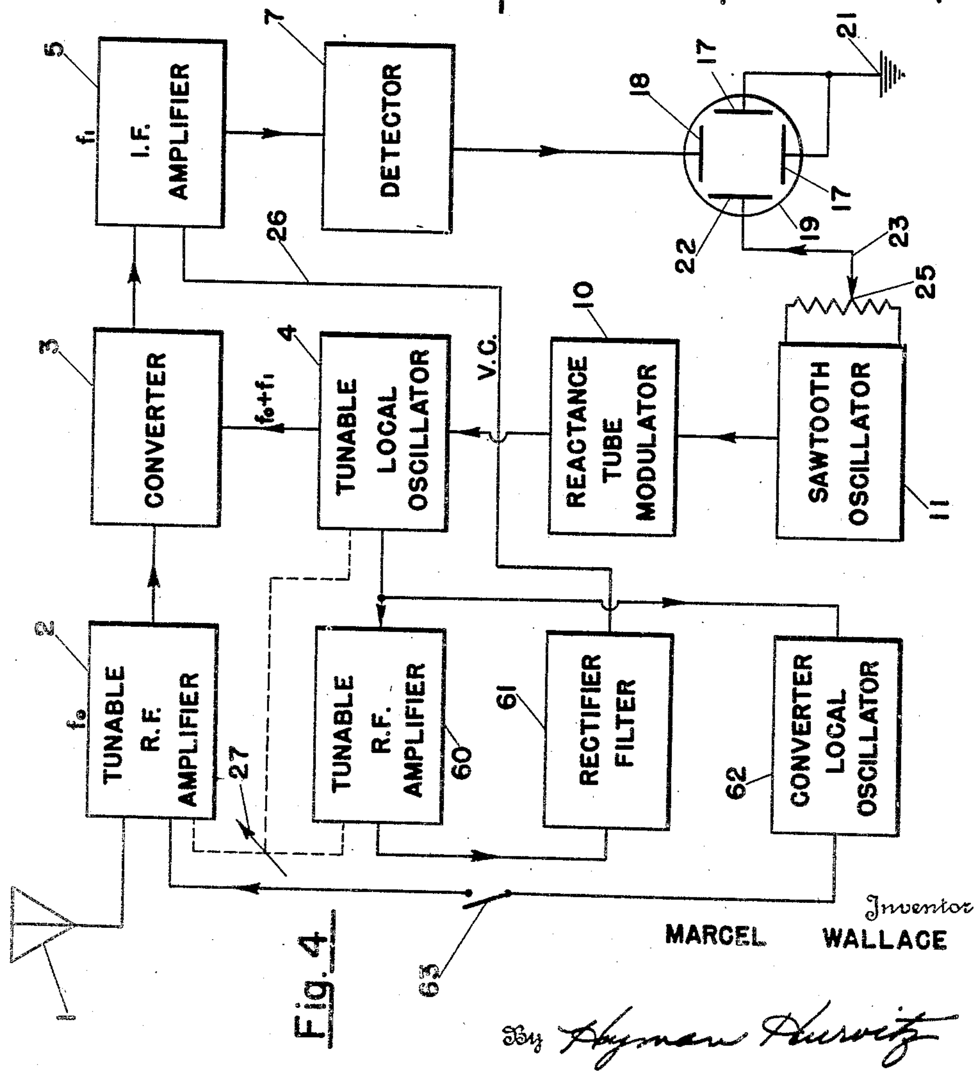
Figure 4 is a block circuit diagram of an attachment for panoramic devices, illustrating a method of inserting a desired test signal into the input of the receiver, and of deriving a fully automatic dynamic compensation voltage.

Referring now specifically to Figure 4 of the accompanying drawings, there is illustrated a panoramic receiver, similar in some respects to the receiver illustrated in Figure 2 of the drawings, but in which a dynamic compensation voltage may be derived from a tunable circuit which substantially duplicates the receiver input circuit, and which is ganged therewith, but is offset in frequency with respect thereto. Additionally, Figure 4 illustrates an accessory device for panoramic receivers, capable of inserting into the receiver a variable frequency input signal which is rendered visible on the oscilloscope-indicator of the receiver to indicate the extent to which compensation is actually being effected. The accessory device may be utilized to determine the efficacy of adjustments which may be made with a view to improving compensation, and consequently may materially assist in carrying out such adjustments.

In Figure 4 of the drawings, signals are received on an antenna 1 amplified in a tunable amplifier 2, converted in the mixer 3 to a convenient I. F. frequency, and thereafter amplified in I. F. amplifier 5 and detected in the video detector 7, the output of which is applied to one horizontal plate 18, of a cathode ray indicator 19, the other horizontal plate 17 being grounded at 21.

Horizontal sweep voltage for the indicator 19 is derived from a sawtooth generator 11, and applied via potentiometer 25 and line 23 to one horizontal plate 22 of the cathode ray indicator 19, the other horizontal plate 17 being grounded at 21.

The voltage generated by the sawtooth generator 11 may be applied to a reactance tube modulator 10, to cause the modulator 10 to vary the frequency of a local oscillator 4 about a central frequency determined by the tuning of the receiver, the tunable R. F. amplifier 2 and the local oscillator 4 being ganged by means of linkage 27.

Let us assume that the incoming frequency $f_0$ is to be converted to an I. F. frequency of $f_1$, necessitating a local oscillator frequency $f_0+f_1$.

Ganged with the tunable R. F. amplifier 2 is a duplicate device 60, tuned, however, to a slightly different frequency than is the R. F. amplifier 2, that frequency being $f_0+f_1$, or the same as the frequency of the local oscillator frequency central or unmodulated frequency. Signals applied to the amplifier 60 from the local oscillator 4, being frequency modulated, and sweeping over the resonance characteristic of the tunable R. F. amplifier 60, are derived at the output of the circuit 60 modulated in amplitude precisely in the shape of the resonance characteristic of the circuit 60.

The output of the circuit 60 may be rectified and filtered in the circuit device 61 to provide a dynamic compensation voltage to the I. F. amplifier 5, via the line 26.

While I have described the circuits 2 and 60 as amplifiers, it will be obvious that tunable preselector filters may be utilized if desired, and that if desired ganged gain controls may be provided for the circuits 2 and 60, or separately adjustable gain control means may be provided.

It will further be obvious that although I have illustrated the dynamic compensation signal as applied to control the gain of the I. F. amplifier, that the gain of any other gain controllable part of the receiver circuit might well have been selected for control.

It will be obvious that since the circuits 2 and 60 are substantial duplicates except for a slight offset in respect to frequency, that the electrical characteristics of the circuits will be very similar, and that the dynamic compensation voltage will accordingly be of proper amplitude and shape for all conditions of operation of the receiver of Figure 4, in respect not only to frequency range in which operation may be taking place, but also in respect to width of the band frequencies being scanned, and in respect to asymmetries of circuits.

Signals derived from the local oscillator 4 and centered at frequency $f_0+f_1$, may be reduced in frequency to the center frequency $f_0$, by applying same to a converter-local oscillator 62, the local oscillator provides a signal at the frequency $f_1$. The output signal of the device 62 may be applied as test signals via a manual switch 63 to the input of the tunable R. F. amplifier 2, and will be ampified, detected and applied to the vertical plate 18 of the indicator 19.

Since the local oscillator 4 is frequency modulated, the test signal will be likewise frequency modulated, and substantially in synchronism with the sawtooth sweep voltage provided by the generator 11. The indicator 19 will provide, under these circumstances, a visual indication of the over-all frequency characteristic of the panoramic receiver for any given frequency band centered on $f_0$, and thereby a direct indication of the efficacy of the dynamic compensation under all and any conditions of the receiver may be obtained by mere momentary closure of the switch 63.

Figure 5:
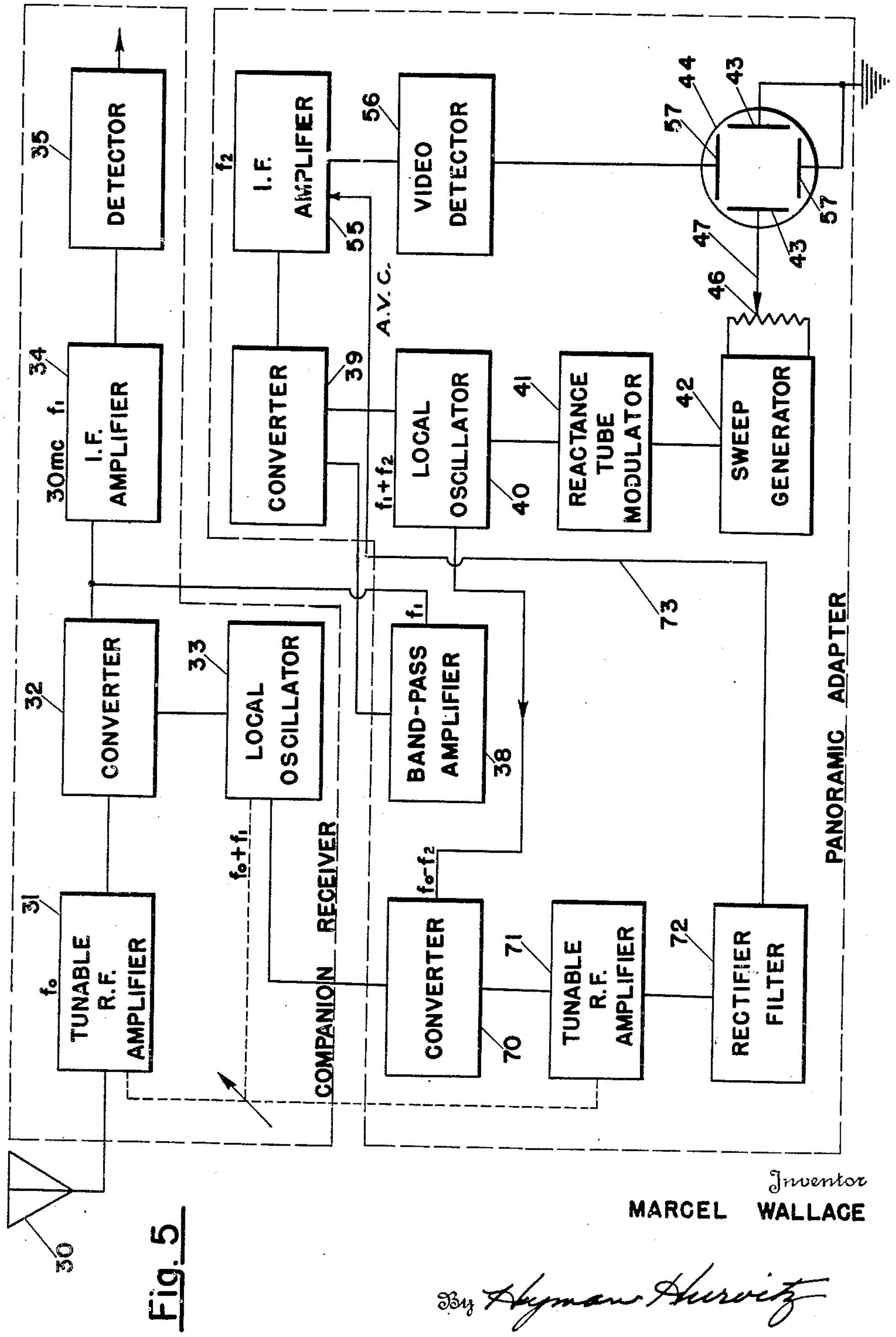
Figure 5 is a block circuit diagram of still a further embodiment of the invention, illustrating a fully automatic dynamic compensation method for panoramic devices.

Referring now to Figure 5 of the drawings, there is illustrated schematically a panoramic adaptor combined with a companion receiver.

The companion receiver is conventional and includes the antenna 30, tunable R. F. amplifier or preselector circuit 31, the converter 32 and local oscillator 33, the I. F. amplifier 34 and the detector 35, from which signals may be applied to an output device.

Signals derived from the output of the converter 32 are applied to a band-pass amplifier 38 of the panadaptor, which is capable of passing without substantial attenuation the maximum band of frequencies which may be indicated on the face of the cathode ray indicator 44.

Signals derived from the band-pass amplifier 38 are applied to a converter 39, where they are suitably mixed with local oscillations to provide an I. F. signal, the latter being amplified in the amplifier 55, detected in detector 56 and applied thence to the vertical plate 57 of the oscilloscope 44. The local oscillator 40 is frequency modulated by the reactance tube modulator 41 under the control of signals derived from the sweep voltage generator 42, similar signals being applied via potentiometer 46 to one horizontal plate 43 of the oscilloscope 44.

Let us assume that amplifier or preselector 31 is tuned to a central frequency $f_0$, that the local oscillator frequency is $f_0+f_1$, and the I. F. frequency to which the amplifier 34 is tuned is $f_1$. In the panadaptor, the I. F. amplifier is tuned to frequency $f_2$, and the local oscillator centers about the frequency $f_1+f_2$. If now signals derived from local oscillator 33 and from local oscillator 40 are applied to a mixer or converter 70, a difference frequency may be derived from the latter which will be frequency modulated, with deviations corresponding to those of the oscillator 40 and a center frequency $f_0-f_2$. This frequency $f_0-f_2$ may be applied to a tunable R. F. amplifier or preselector 71 which may be ganged with the circuit 31, but offset in frequency therefrom by $-f_2$ cycles. Rectification and filtering of the output of the amplifier or preselector 71 in a suitable device 72 will then result in a suitable dynamic compensation voltage which may be applied via lead 73 to the I. F. amplifier 55, and/or to any other gain controllable circuit of the panoramic adaptor.

It will, of course, be evident that introduction of a test signal into the panoramic receiver of Figure 5 may be accomplished in precisely the same manner as has been disclosed with respect to Figure 4, and in fact, that the expedient of introducing a test signal for providing indications of efficacy of compensation may be desirable and is utilizable, quite irrespective of the type of compensation applied or of the type of panoramic device to which same may be applied.

It will be realized that while I have disclosed a potentiometer device 15 at the output of the full wave rectifier 14, in Figure 2, that an amplifier having a controllable gain might be substituted therefor, if desired, the gain of the amplifier being controlled in response to the adjustment of the ganging device 24.

It will be further realized, in connection with each embodiment of my invention, as illustrated in each of Figures 2 to 4 inclusive, that in the event the main receiver channel of the receiver is normally designed or adjusted for high gain, it will be desirable to reduce the overall gain of the said main receiver channel at the high amplitude points, since in such event the edges of the band of received frequencies will be displayed at or near desired values. On the other hand, should the overall receiver gain be adjusted to provide indications having desirable amplitudes for signals adjacent the center of the band, it will be necessary to adjust the dynamic compensating voltage to provide increased gain at the edges of the band.

Adjustments of the character referred to in the previous paragraph may be accomplished readily in my system by the simple expedient of suitably adjusting the phase of the sweep circuit voltage relative to that of the dynamic compensation voltage, by means of the phase adjustment means provided in each embodiment of the invention.

While I have illustrated and described four specific embodiments of my invention, it is to be understood that various modifications of these embodiments and of the invention may be resorted to, both as respects the general arrangement of the combination, as well as the details of construction, without doing violence to the spirit of the invention, as defined and particularly pointed out in the appended claims.

What I claim and desire to secure by Letters Patent of the United States is as follows:

1. In a receiving system, the combination of an input circuit for translating signals in a predeterminable range of frequencies, said input circuit having a predetermined sensitivity versus frequency characteristic approximating in shape a segment of a sinusoid having a maximum amplitude located intermediate the ends of said range of frequencies, a gain controllable frequency scanning translating means for periodically analyzing frequencies in said range sequentially including a visual indicator, comprising a source of full wave sinusoidal alternating current signals, means comprising a first distinct signal path for providing a reference base line calibratable in terms of frequency, said last named means including an oscillator device for generating periodic substantially sawtooth signals synchronized with said sinusoidal signals and means comprising a second distinct signal path connected to said source of sinusoidal signals for developing a periodically time variable gain control voltage of sinusoidal character for said gain controllable frequency scanning translating means for substantially compensating for said sensitivity versus frequency characteristic.

2. The combination in accordance with claim 1 wherein said means for developing a gain control voltage comprises a rectifier for deriving from said alternating current signals gain control voltage of full wave rectified sine wave character.

3. The combination in accordance with claim 1 wherein is provided means for varying the extent of frequency scanning of said gain controllable frequency scanning translating means, and for simultaneously varying the amplitude of said gain control voltage.

4. The combination in accordance with claim 1 wherein is provided ganged manual means for varying the extent of frequency scanning of said gain controllable frequency scanning translating means, and for simultaneously varying the amplitude of said gain control voltage.

5. The combination in accordance with claim 1 wherein is provided means for varying the extent of frequency scanning of said gain controllable frequency scanning translating means, and means responsive to a measurement of the extent of said frequency scanning for controlling the amplitude of said gain control voltage.

6. In a panoramic receiving system for signals occupying a predetermined relatively wide band of frequencies, first translating means for translating said signals, said first translating means having a response characteristic such as to provide unequal response to signals at different ones of said frequencies, means for applying said signals to said first translating means for translation thereby, a second relatively narrow band gain controllable signal translating means adjustable to scan over said relatively wide band of frequencies, means coupling said second translating means in cascade with said first translating means, a source of voltage having alternate equal portions of opposite polarity and a frequency proportional to the frequency of said scan, means comprising a first distinct signal path connected to said source of voltage for effecting said scan periodically in response to said last named voltage, said last mentioned means including a scanning oscillator, means comprising a second distinct signal path connected to said voltage source for utilizing said voltage as a gain control voltage for varying the gain of said gain controllable translating means continuously during each scan, over values of gain adequate to render substantially equal at all frequencies of said relatively wide band of frequencies the combined responses of said first and second translating means, a visual indicator, means for continuously deriving signal output from said second translating means during each of said scans, and means responsive to said signal output and to said voltage for actuating said visual indicator to provide a plot of amplitude versus frequency of said signals.

7. In a receiving system, the combination of a source of signals, first translating means for said signals having a response characteristic over a predetermined band of frequencies such as to respond unequally to different frequencies in said band of frequencies, a primary unsynchronized source of voltage of equal alternately positive and negative portions, frequency scanning translating means continually adjustable with respect to gain for visually indicating sequentially the amplitudes of signals within said predetermined band of frequencies, means comprising a first distinct signal path connected to said voltage source for controlling said frequency scanning, said last mentioned means including a scanning oscillator means comprising a second distinct signal path connected to said voltage source employing said voltage as a gain control voltage for continuously adjusting the gain of said frequency scanning translating means in accordance with a time law of variation of gain such as to compensate for said response characteristic of said first translating means.

8. In a signal analyzing system, the combination of an input circuit for translating simultaneously a band of signals in a predeterminable frequency range, said input circuit having a predetermined unequal response for different frequencies in said frequency range, a source of A. C. scanning control voltage each cycle of which has substantially equal positive and negative portions, gain controllable frequency scanning means responsive to said A. C. scanning control voltage for analyzing the character of signals occurring within said range, said last mentioned means comprising a first distinct signal path, including a scanning oscillator, connected to said voltage source for effecting scanning of said scanning means, means comprising a second distinct signal path connected to said voltage source for full wave rectifying said A. C. scanning control voltage to generate a rectified voltage, means employing said rectified voltage as a gain control voltage for controlling the gain of said frequency scanning means for substantially compensating for said unequal response at each frequency of said range.

9. A receiving system comprising a combination of a relatively wide band signal input circuit having unequal sensitivity to signals of different frequency within a selected portion of a frequency spectrum, a relatively narrow band amplifier having a predetermined resonance characteristic, a source of A. C. voltage having alternate elements of opposite polarity, frequency scanning conversion means operable in response to said A. C. sweep voltage, sequentially to translate signals available in said wide band input circuit to frequencies suitable for amplification in said narrow band amplifier, said last mentioned means comprising a first distinct signal path, including a scanning oscillator, connected to said voltage source for effecting scanning of said scanning means, cathode ray tube indicator means having at least two sets of deflection means, means for applying signals derivable from said narrow band amplifier, to one of said sets of deflection means, means for applying A. C. sweep signal to a second of said sets of deflection means, means comprising a second distinct signal path connected to said voltage source for full wave rectifying said sweep voltage to generate a gain control voltage, and means for varying the gain of said narrow band amplifier in response to said gain control voltage in synchronism with said frequency scanning and in accordance with a time law adapted to compensate for said unequal sensitivity of said input circuit.

10. In a receiving system, the combination of, an input circuit for translating signals in a predeterminable range of frequencies, said input circuit having a sensitivity characteristic in said range providing unequal responses of said input circuit to different ones of said frequencies, a source of A. C. voltages gain controllable translating means for periodically analyzing the frequency of signals in said range sequentially, said last mentioned means comprising a first distinct signal path, including a scanning oscillator, connected to said voltage source for effecting scanning of said scanning means, an indicator comprising means including said scanning oscillator for providing a reference base calibratably in terms of frequency means, a second distinct signal path connected to said voltage source for full wave rectifying said A. C. voltage to provide a gain control voltage wave for said gain controllable translating means, said voltage wave having a shape bearing a predetermined relation to the sensitivities of said input circuit over said predeterminable range of frequencies, and means for synchronising operation of said translating means, of said means for providing a reference base, and of said means to provide a gain control voltage.

11. The combination in accordance with claim 10 wherein is further provided means for varying the extent of said predeterminable range of frequencies, and means responsive to said last means for adjusting the shape of said gain control voltage wave.

12. A receiving system, comprising the combination of, a tunable input circuit for translating signals in any one of a plurality of predeterminable ranges of frequencies, means for tuning said tunable input circuit to any one of said plurality of ranges of frequencies, said input circuit having a different sensitivity versus frequency characteristic when tuned to each separate one of said plurality of ranges, frequency scanning panoramic means for analyzing signals translatable by said tunable input circuit, said frequency scanning panoramic means including a source of A. C. scan control voltage, means comprising a first distinct signal path, including a scanning oscillator, connected to said voltage source for effecting scanning of said frequency scanning means, means comprising a second distinct signal path connected to said voltage source for utilizing said scan control voltage as a gain control voltage, means for varying the gain of said frequency scanning means in response to said gain control voltage during each scan of said frequency scanning means over a range of values adapted to compensate for the variable sensitivities of said tunable input circuit, and means for controlling said means for varying gain in response to said means for tuning.

References Cited in the file of this patent

UNITED STATES PATENTS

| | | |
|---|---|---|
| 1,935,401 | Kenney | Nov. 14, 1933 |
| 2,084,760 | Beverage | June 22, 1937 |
| 2,196,248 | Burnside | Apr. 9, 1940 |
| 2,196,259 | Foster | Apr. 9, 1940 |
| 2,224,678 | Hathaway | Dec. 10, 1940 |
| 2,236,497 | Beers | Apr. 1, 1941 |
| 2,287,925 | White | June 30, 1942 |
| 2,288,554 | Smith | June 30, 1942 |
| 2,367,907 | Wallace | Jan. 23, 1945 |
| 2,381,940 | Wallace | Aug. 14, 1945 |
| 2,387,685 | Samders | Oct. 23, 1945 |
| 2,389,025 | Campbell | Nov. 13, 1945 |
| 2,408,858 | Keizer | Oct. 8, 1946 |
| 2,409,012 | Bliss | Oct. 8, 1946 |
| 2,418,425 | Poch | Apr. 1, 1947 |
| 2,499,995 | Heller | Mar. 7, 1950 |

OTHER REFERENCES

Millman, "Electronics," McGraw-Hill, 1941; page 513.

Moulic, "Panoramic Principles," Electronic Industries, July 1944; pages 86 to 88 and 206.